(12) United States Patent
Tenyer

(10) Patent No.: US 8,083,883 B2
(45) Date of Patent: Dec. 27, 2011

(54) METHOD FOR MAKING LAMINATED, PAPER CARDS

(75) Inventor: Joseph Tenyer, Barrington, IL (US)

(73) Assignee: Jet Lithocolor, Inc., Downers Grove, IL (US)

( * ) Notice: Subject to any disclaimer, the term of this patent is extended or adjusted under 35 U.S.C. 154(b) by 5 days.

(21) Appl. No.: 12/702,460

(22) Filed: Feb. 9, 2010

(65) Prior Publication Data
US 2011/0192532 A1 Aug. 11, 2011

(51) Int. Cl.
*B32B 37/00* (2006.01)
*B32B 38/04* (2006.01)

(52) U.S. Cl. ......... 156/250; 156/182; 156/311; 156/312

(58) Field of Classification Search .................. 156/270, 156/182, 277, 285, 311, 312; 428/203, 213, 428/215; 273/295
See application file for complete search history.

(56) References Cited

U.S. PATENT DOCUMENTS

| | | | |
|---|---|---|---|
| 2,008,974 A * | 7/1935 | Weber | 156/207 |
| 5,654,050 A * | 8/1997 | Whalen-Shaw | 428/35.7 |
| 7,005,028 B2 * | 2/2006 | Middelstadt et al. | 156/264 |
| 7,461,791 B2 | 12/2008 | Keshura | |
| 7,632,566 B2 * | 12/2009 | Koike | 428/316.6 |
| 2004/0182504 A1 * | 9/2004 | Stadele et al. | 156/210 |
| 2005/0100714 A1 * | 5/2005 | Sutcliffe et al. | 428/184 |
| 2009/0117354 A1 * | 5/2009 | Miura et al. | 428/211.1 |
| 2011/0052818 A1 * | 3/2011 | Osterberg et al. | 427/361 |

FOREIGN PATENT DOCUMENTS

JP 0800353 * 1/1996
JP 2009282407 A * 12/2009

* cited by examiner

*Primary Examiner* — Linda L Gray
(74) *Attorney, Agent, or Firm* — Gary R. Jarosik

(57) ABSTRACT

Laminated, paper cards are manufactured by adhering a first side of a calendared paper to a first side of a fiber board stock using a biodegradable adhesive to thereby create a sheet of material. A card construct is then formed by adhering a second side of the fiber board stock of a first sheet of material to a second side of the fiber board stock of a second sheet of material using a biodegradable adhesive. A second side of at least one of calendared papers of the card construct is then printed and the printed card construct is then subjected to a heat and pressure treatment in a hydraulic press. The treated, printed, card construct may then be die punched to provide one or more of the laminated, paper cards.

19 Claims, 1 Drawing Sheet

METHOD FOR MAKING LAMINATED, PAPER CARDS

BACKGROUND

Laminated, plastic cards, such as transaction cards, are known in the art. As described in U.S. Pat. No. 7,461,791, laminated, plastic cards are used for a wide variety of purposes, including purchases, gift giving, ATM or other banking transactions, proof of identity, membership, loyalty, building entry access cards, and so on. High-quality, plastic cards are typically made by printing or otherwise forming image information on a plastic sheet substrate, e.g., to display the name of an issuer of the card, terms of use of the card, graphics, logos, or other information. After image formation, a thin overlaminate film is applied to both sides of the plastic sheet substrate. The films are typically made of a polyvinyl chloride (PVC), PET, PETG, polycarbonate or other polymer material, and are secured to one or both sides of the plastic sheet substrate by subjecting the plastic sheet substrate and films to heat and pressure in a laminating press. The lamination process functions to secure the films to the plastic sheet substrate so that the image information is sealed in and the films cannot be removed from the plastic sheet substrate without destroying the laminated product. Once the lamination process is complete, one or more cards may be cut from the sheet, e.g., using a cutting process, such as a die cut or punching process.

SUMMARY

The present invention is directed to a method for making laminated, paper cards. In particular, laminated, paper cards are manufactured by adhering a first side of a calendared paper to a first side of a fiber board stock using a biodegradable adhesive to thereby create a sheet of material. A card construct is then formed by adhering a second side of the fiber board stock of a first sheet of material to a second side of the fiber board stock of a second sheet of material using a biodegradable adhesive. A second side of at least one of calendared papers of the card construct is then printed and the printed card construct is then subjected to a heat and pressure treatment in a hydraulic press. The treated, printed, card construct may then be die punched to provide one or more of the laminated, paper cards.

A better understanding of the objects, advantages, features, properties and relationships of the subject method for making laminated, paper cards will be obtained from the following detailed description and accompanying drawing which sets forth an illustrative, preferred embodiment that is indicative of the various ways in which the principles of the invention may be employed.

BRIEF DESCRIPTION OF THE DRAWINGS

For a better understanding of the invention reference may be made to FIG. 1 which illustrates an exemplary laminated, paper card constructed according to the subject method.

DETAILED DESCRIPTION

Figure 1:
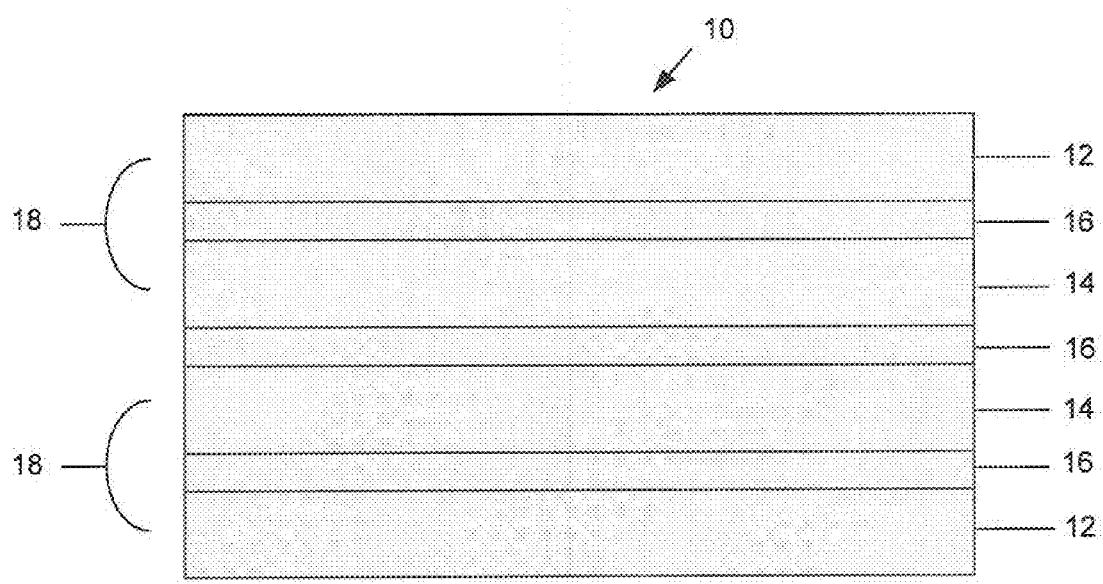

The following describes an improved and efficient method for making laminated, paper cards, such as a credit/debit cards, financial transaction cards, gift cards, security cards, loyalty cards, stored-value cards, pre-paid cards, phone cards, merchandise return cards, business cards, novelty cards, playing cards, trading cards, promotional cards, or like cards without limitation. More particularly, the method described hereinafter is useful in producing a four layer, laminated, paper card 10 having an overall thickness in a range between approximately 20 Mils and approximately 30 Mils ("Mils" being a unit of length equal to one thousandth ($10^{-3}$) of an inch or 0.0254 millimeter). As will be understood, a constructed laminated, paper card can be provided with a magnetic stripe (e.g., to identify a carrier, link to a financial account, etc.), can be imaged or printed with encoded images (e.g., to provide a barcode), etc. as desired.

To construct the laminated, paper cards, a first side of a high quality, lithographic grade, calendared paper 12, having a thickness between approximately 4 Mils and approximately 6 Mils, is adhesively mounted to a first side of a dense, cellulose fiber, board stock 14, having a thickness between approximately 6 Mils and approximately 9 Mils, using a biodegradable adhesive 16 to create a sheet of material 18. By way of example only, the biodegradable adhesives used to adhesively mount the calendared paper 12 to the board stock 14 may be a water based emulsion adhesive. A card construct sheet is then formed by adhesively mounting the fiber board stock 14 side of two sheets of material 18 constructed in this manner to one another, again using a biodegradable adhesive, such that the high quality, lithographic grade, calendared paper 12 in each of the sheets of material 18 is exposed on both sides of the card construct sheet thus equally balancing the finished core stock.

The exposed sides of the high quality, lithographic grade, calendared paper 12 of the card construct sheet may then be subjected to an offset printing process which may then be provided with an optional UV coating. Card construct sheets printed without a UV coating may be printed with conventional printing inks while card construct sheets with a UV coating will be printed with UV curable inks.

After the card construct sheet is printed, card construct sheets printed without the use of a UV coating are thermal laminated with cellulose based acetate. This acetate also utilizes a biodegradable adhesive such as an EVA polymer with biodegradable additives. To this end, the card construct sheets are fed into a roller machine between two layers of cellulose over laminate and then nipped between two heated rollers. The heated rollers activate the adhesive allowing the cellulose to adhere to the printed sheets. Meanwhile, card construct sheets printed with the use of a UV coating do not require a thermal laminate application and, as such, can be moved directly to the hydraulic lamination process described below.

After application of the thermal laminate, if provided, the card construct sheets are then placed into a hydraulic press under specific and heat and pressure recipes to ensure an acceptable gloss or matte surface and cooling and pressure recipes to ensure a flat result. To this end, the temperature range of the heated cycle is between approximately 230 degrees F. and approximately 240 degrees F. and the desired cooling temperature is between approximately 60 degrees F. and approximately 70 degrees F. The pressure of the heating press is approximately 150 psi while the pressure of the cooling press is approximately 300 psi.

After hydraulic press polishing, the card construct sheets are then fed into a sensor registered punching press whereupon engineered hard tool dies are used to punch the card construct sheets to desired card shapes. The dies are manufactured in a way to cut from both sides in a shearing fashion to guarantee a smooth edge without rough edges or ticks.

From the foregoing it will be appreciated that the subject method has the advantage of providing laminated, paper cards which are both durable and eco-friendly. While an example method for making such cards has been described in detail, it will be appreciated by those skilled in the art that various modifications and alternatives to those details could be developed in light of the overall teachings of this disclosure to thereby obtain the advantages above noted. Accordingly, the particular method disclosed is meant to be illustrative only and not limiting as to the scope of the invention which is to be given the full breadth of the appended claims and any equivalents thereof.

What is claimed is:

1. A method for making a laminated, paper card, comprising:
adhering a first, flat side of a calendared paper to a first, flat side of a cellulose fiber board stock using a biodegradable adhesive to create a first, flat sheet of material;
adhering a first, flat side of a calendared paper to a first, flat side of a cellulose fiber board stock using a biodegradable adhesive to create a second, flat sheet of material;
adhering a second, flat side of the cellulose fiber board stock of the first, flat sheet of material to a second, flat side of the cellulose fiber board stock of the second, flat sheet of material using a biodegradable adhesive to create a flat, card construct;
providing a print to a second, flat side of at least one of the calendared papers of the flat card construct;
subjecting the printed card construct to a heat and pressure treatment in a hydraulic press; and
punching from the treated, printed, card constructs one or more flat, laminated, paper cards;
wherein the heat and pressure treatment comprises subjecting the printed card construct to a temperature between approximately 230 degrees F. and approximately 240 degrees F. at a pressure of approximately 150 psi and then subjecting the printed card construct to a temperature between approximately 60 degrees F. and approximately 70 degrees F. at a pressure of approximately 300 psi.

2. The method as recited in claim 1, wherein the one or more flat, laminated, paper cards have an overall thickness in a range between 20 Mils and 30 Mils.

3. The method as recited in claim 2, wherein the calendared paper in both the first, flat sheet of material and the second, flat sheet of material has a thickness between 4 Mils and 6 Mils and the cellulose fiber board stock in both the first, flat sheet of material and the second, flat sheet of material has a thickness between 6 Mils and 9 Mils.

4. The method as recited in claim 3, wherein the biodegradable adhesive comprises a water based emulsion adhesive.

5. The method as recited in claim 1, wherein the biodegradable adhesive comprises a water based emulsion adhesive.

6. The method as recited in claim 1, wherein the calendared paper in both the first, flat sheet of material and the second, flat sheet of material comprises a lithographic grade calendared paper.

7. The method as recited in claim 6, comprising using an offset printing process to provide the print to a second, flat side of at least one of the calendared papers of the flat card construct.

8. The method as recited in claim 1, comprising providing a UV coating to the second, flat side of the calendared papers of the flat card construct.

9. The method as recited in claim 1, comprising providing a thermal laminate to the second, flat side of the calendared papers of the flat card construct.

10. The method as recited in claim 9, wherein the thermal laminate is provided to the second, flat side of the calendared papers by feeding the flat card construct into a roller machine having heated rollers between two layers of cellulose over laminate.

11. A method for making a laminated, paper card, comprising:
adhering a first, flat side of a calendared paper to a first, flat side of a cellulose fiber board stock using a biodegradable adhesive to create a first, flat sheet of material;
adhering a first, flat side of a calendared paper to a first, flat side of a cellulose fiber board stock using a biodegradable adhesive to create a second, flat sheet of material;
adhering a second, flat side of the cellulose fiber board stock of the first, flat sheet of material to a second, flat side of the cellulose fiber board stock of the second, flat sheet of material using a biodegradable adhesive to create a flat, card construct;
providing a print to a second, flat side of at least one of the calendared papers of the flat card construct;
subjecting the printed card construct to a simultaneously applied heat and pressure treatment followed by a simultaneously applied cooling and pressure treatment; and
punching from the treated, printed, card constructs one or more flat, laminated, paper cards.

12. The method as recited in claim 11, wherein the one or more flat, laminated, paper cards have an overall thickness in a range between 20 Mils and 30 Mils.

13. The method as recited in claim 11, wherein the calendared paper in both the first, flat sheet of material and the second, flat sheet of material has a thickness between 4 Mils and 6 Mils and the cellulose fiber board stock in both the first, flat sheet of material and the second, flat sheet of material has a thickness between 6 Mils and 9 Mils.

14. The method as recited in claim 11, wherein the biodegradable adhesive comprises a water based emulsion adhesive.

15. The method as recited in claim 11, wherein the calendared paper in both the first, flat sheet of material and the second, flat sheet of material comprises a lithographic grade calendared paper.

16. The method as recited in claim 11, comprising providing a UV coating to the second, flat side of the calendared papers of the flat card construct.

17. The method as recited in claim 11, comprising providing a thermal laminate to the second, flat side of the calendared papers of the flat card construct.

18. The method as recited in claim 17, wherein the thermal laminate is provided to the second, flat side of the calendared papers by feeding the flat card construct into a roller machine having heated rollers between two layers of cellulose over laminate.

19. The method as recited in claim 11, wherein pressure applied during the simultaneously applied cooling and pressure treatment is larger than pressure applied during the simultaneously applied heating and pressure treatment.

* * * * *